US012273327B2

(12) United States Patent
Race et al.

(10) Patent No.: US 12,273,327 B2
(45) Date of Patent: Apr. 8, 2025

(54) PRIVACY-PRESERVING AUGMENTED AND VIRTUAL REALITY USING HOMOMORPHIC ENCRYPTION

(71) Applicant: Intel Corporation, Santa Clara, CA (US)

(72) Inventors: Kylan Race, Austin, TX (US); Ernesto Zamora Ramos, Folsom, CA (US); Jeremy Bottleson, North Plains, OR (US); Bradley Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 17/935,831

(22) Filed: Sep. 27, 2022

(65) Prior Publication Data

US 2024/0106803 A1     Mar. 28, 2024

(51) Int. Cl.
| | |
|---|---|
| *H04L 9/00* | (2022.01) |
| *G06V 20/40* | (2022.01) |
| *H04L 9/40* | (2022.01) |
| *H04L 67/131* | (2022.01) |

(52) U.S. Cl.
CPC .......... *H04L 63/0428* (2013.01); *H04L 9/008* (2013.01); *H04L 67/131* (2022.05)

(58) Field of Classification Search
None
See application file for complete search history.

(56) References Cited

U.S. PATENT DOCUMENTS

| | | | | |
|---|---|---|---|---|
| 11,916,947 | B2* | 2/2024 | Kapoor | .................. H04L 43/06 |
| 2014/0362236 | A1* | 12/2014 | Harple | ............... H04N 1/00214 |
| | | | | 348/207.1 |
| 2022/0255763 | A1* | 8/2022 | Campbell | ........... G06F 21/6245 |
| 2022/0406213 | A1* | 12/2022 | Warren | .................. G09B 9/165 |
| 2023/0027423 | A1* | 1/2023 | Rao | ........................ G06F 7/5443 |
| 2023/0144604 | A1* | 5/2023 | Guthrie | .................. G06N 20/20 |
| | | | | 434/30 |
| 2024/0104224 | A1* | 3/2024 | Ramos | .................. H04L 9/0825 |

OTHER PUBLICATIONS

Ernesto Zamora Ramos, "Improving Pattern Recognition and Neural Network Algorithms with Applications to Solar Panel Energy Optimization," Aug. 2017, 293 pages, University of Nevada.
Junfeng Fan and Frederik Vercauteren, "Somewhat Practical Fully Homomorphic Encryption," IACR Cryptol. ePrint Arch., 2012, 19 pages.

(Continued)

*Primary Examiner* — Christopher B Robinson
(74) *Attorney, Agent, or Firm* — Nicholson DeVos Webster & Elliott LLP

(57) ABSTRACT

An improved AR/VR operation includes receiving, by a server computing device, encrypted AR/VR user data and cleartext metadata associated with the encrypted AR/VR user data from a client computing device; getting server data based at least in part on cleartext metadata; encoding the server data; performing an AR/VR process on the encrypted AR/VR user data and the encoded server data to generate encrypted AR/VR results; and sending the encrypted AR/VR results to the client computing device.

13 Claims, 13 Drawing Sheets

(56) References Cited

OTHER PUBLICATIONS

Jung Hee Cheon et al., "Homomorphic Encryption for Arithmetic of Approximate Numbers," International Conference on the Theory and Application of Cryptology and Information Security, Nov. 30, 2017, 23 pages.
Karen Simonyan and Andrew Zisserman, "Very Deep Convolutional Networks for Large-Scale Image Recognition," ICLR, 2015, 14 pages.
Srikanth Tammina, "Transfer Learning Using VGG-16 with Deep Convolutional Neural Network for Classifying Images," International Journal of Scientific and Research Publications, Oct. 2019, pp. 143-150, vol. 9, Issue 10.
Zvika Brakerski and Craig Gentry, "Fully Homomorphic Encryption without Bootstrapping," 2011, 27 pages.

* cited by examiner

PRIVACY-PRESERVING AUGMENTED AND VIRTUAL REALITY USING HOMOMORPHIC ENCRYPTION

FIELD OF THE DISCLOSURE

This disclosure relates generally to security in computing systems, and more particularly, to protecting the privacy of communications for augmented and virtual reality in computing systems using homomorphic encryption.

BACKGROUND

Current compute intensive solutions for Augmented Reality (AR) and Virtual Reality (VR) require users to send images of their surroundings, location, and other private information to service providers in order to deliver a high-quality experience. Examples of this type of application include AR mobile games (such as PokemonGo). While using such AR/VR applications users must trust service providers to protect and maintain their data. However, service providers can use the user's personal data for their own purposes (e.g., sell the data or mine the data). The AR/VR applications may also be the target of cyberattacks that result in data leaks in the worst case.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
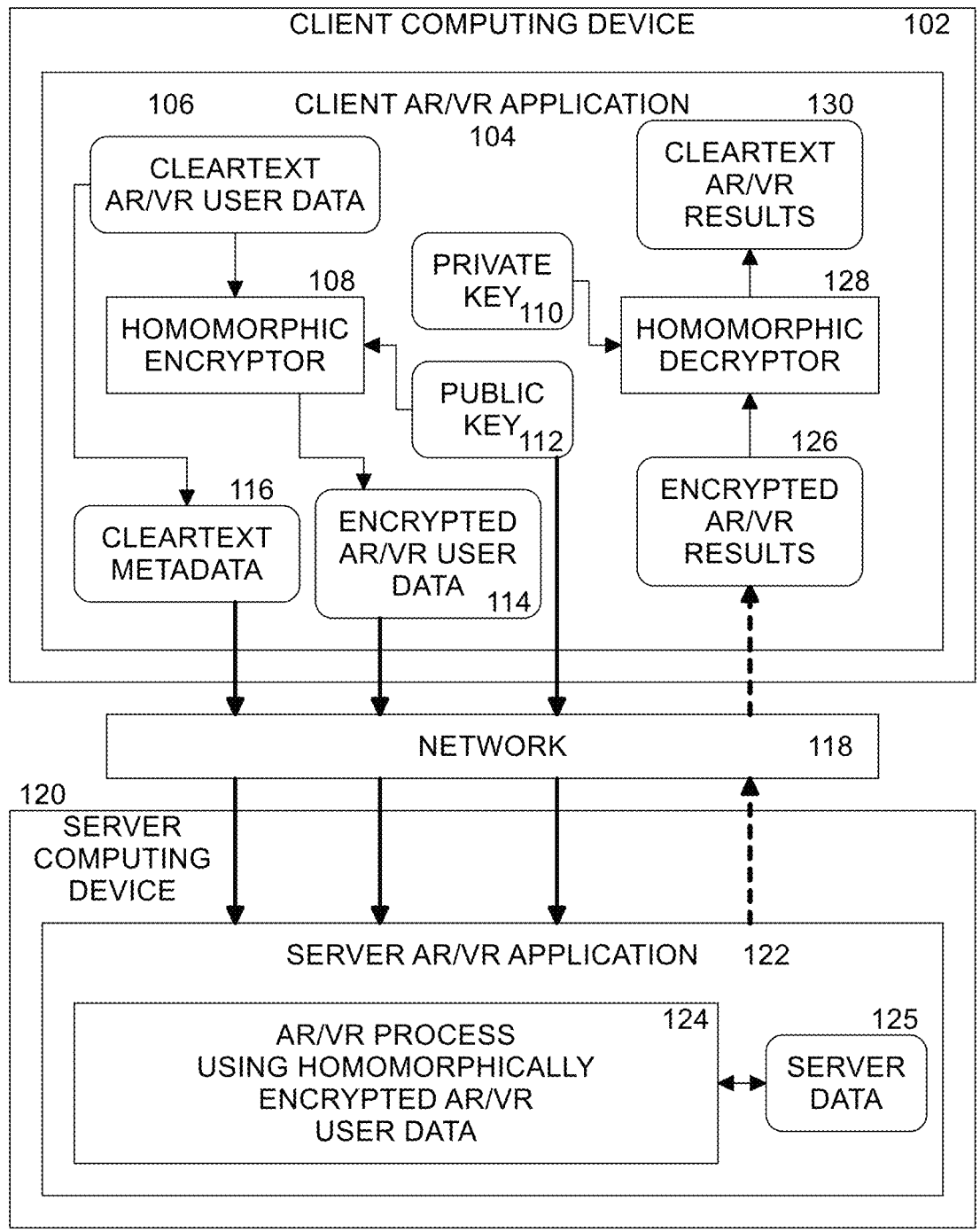
FIG. 1 illustrates a computing system providing protection of privacy when using an AR/VR application according to an example.

The technology described herein provides a method, system, apparatus and machine-readable storage medium to improve protection of privacy for communications between clients and servers in an AR/VR application in a computing system. Homomorphic encryption (HE) allows computations to be performed on encrypted data without revealing input and output information to service providers. The technology described herein provides an AR/VR application system where the user's data is encrypted locally on the user's computing device using HE. The encrypted user's data is then sent over a network (such as the Internet) to a remote service provider providing an AR/VR function. The service provider inputs the encrypted user's data to an HE variant of an AR/VR process. The AR/VR process generates encrypted AR/VR results and sends the encrypted AR/VR results back to the user. Since the user's data is encrypted, a HE variant of the AR/VR process is used, and encrypted AR/VR results are generated, only the user can decrypt the encrypted user's data and encrypted AR/VR results to update the display of the user's AR/VR world view. This protects the privacy of the user's data and AR/VR results from disclosure to the service provider, reduces the service provider's ability to track, spy, and target users, and reduces the risks of data leaks.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor" or "processing device" or "processor circuitry" or "hardware resources" are defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s). As used herein, a device may comprise processor circuitry or hardware resources.

As used herein, a computing system or computing device can be, for example, a server, a personal computer, a workstation, a self-learning machine (e.g., a neural network), a mobile device (e.g., a cell phone, a smart phone, a tablet (such as an iPad')), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, an electronic voting machine, or any other type of computing device.

AR/VR computing devices used by the end user need to be lightweight and wearable for comfort and usability. Compute power and battery life are often restrictive, leading to a large amount of data processing to be performed by dedicated servers or workstations to perform the AR/VR display updates, access information in the world wide web (WWW), and/or provide communications among users. AR/VR applications often rely on remote servers, either from Cloud Server Providers (CSPs) or otherwise, to provide the AR/VR service and functionality.

User data is captured locally by the user's AR/VR computing device (e.g., a smartphone, tablet computer, portable computer, laptop computer, AR/VR headset, etc.). This data can include any relevant data used by the AR/VR application, such as image and video of the user's environment, sounds, location, query terms, user actions, etc. All data captured by the user's device or entered by the user may be considered private and sensitive.

In the technology described herein, captured user data is encrypted using a Homomorphic Encryption Scheme (HE) local to the user. Only the user has access to the private keys necessary to decrypt this data. The encrypted input data is sent over the network to the remote service provider servers where the HE versions of the AR/VR processes are run using the user's encrypted data as input. In HE, the outputs of computations are also encrypted with the user's keys, ensuring the user's data is inaccessible by the service provider throughout the whole operation. The encrypted results are sent back to the user where they are decrypted locally and utilized in the AR/VR application.

The technology described herein improves the protection of privacy of AR/VR user data and AR/VR results in a computing system. As used herein, AR/VR user data may include raw video feed, location/proximity information, user input commands, user gestures, audio data (both user voice data and ambient audio data), etc., and AR/VR results may include a model and world coordinates to place that model for AR, distance to the proximity object, gesture→option translation for popping up correct menus/displays, global positioning system (GPS) location, gaze vector (where the user is looking), health data (pulse, step cadence, other fitness data), biometric data (iris scan, fingerprint scan), unlock sequence (a specific gesture or sequence to verify user identity), and other data.

FIG. 1 illustrates a computing system 100 providing protection of privacy for using an AR/VR process according to an example. Client computing device 102 (e.g., a computing system such as a personal computer, smart phone, tablet computer, etc.) includes client AR/VR application 104 (e.g., an application using augmented reality (AR) and/or virtual reality (VR) features). In one capability, client AR/VR application 104 provides an interface to an AR/VR process provided by a server AR/VR application 122 of a server computing device 120. In an example, the client computing device 102 is coupled to the server computing device 120 by network 118 (such as the Internet or an intranet). When a user of client computing device 102 uses client AR/VR application 104, the client AR/VR application continually gathers cleartext AR/VR user data 106 using any suitable input mechanism (e.g., keyboard, touch screen, microphone (and speech-to-text capability), etc.) or program controls. Cleartext AR/VR user data 106 is unprotected. That is, the AR/VR user data is initially in a clear text format (e.g., not encoded or encrypted and easily readable by anyone). In various examples, cleartext AR/VR user data 106 is a string of characters, an image, or any stream of data provided by the user or the client AR/VR application that may be used by server AR/VR application 122. Client AR/VR application 104 (or via an available cryptographic library, for example) generates a cryptographic key pair including private key 110 and public key 112. Private key 110 is never exposed outside of client AR/VR application 104. Homomorphic encrypter 108 encrypts cleartext AR/VR user data 106 using an HE process using public key 112 to generate encrypted AR/VR user data 114. Client AR/VR application 104 also extracts cleartext metadata 116 from cleartext AR/VR user data 106 and/or otherwise generates one or more portions of cleartext metadata 116 from internal or external information of client AR/VR application 104. Cleartext metadata 116 comprises implementation dependent information regarding the AR/VR process to be carried out, including HE parameters such as what operation(s)/task(s) to perform, the size or number of inputs, the number of outputs to return, etc. HE specific parameters may include polymodulus degree, coefficient modulus, scale bits, plaintext polymodulus, etc. Generally, cleartext metadata 116 may include numerical values which need to be known so that the server AR/VR application 122 can create and/or perform operations correctly on the incoming ciphertext data. Cleartext metadata 116 is in the clear (e.g., unencrypted) and accessible by anyone. Client AR/VR application 104 sends encrypted AR/VR user data 114, cleartext metadata 116 and public key 112 to server AR/VR application 122.

Server AR/VR application 122 comprises an AR/VR process using homomorphically encrypted AR/VR user data 124 and server data 125. In an implementation, server data may be any information in a global database accessible by server computing device 120. For instance, identifying a song that is playing, the name of a location, the name of another user, the distance to a destination. This is contrasted with user data, such as whether the song is favorited, the number of times the location has been visited before, the friendship status of another user, the number of steps taken enroute to a destination, etc.

This AR/VR process is a variant of an existing AR/VR process and adapted to process homomorphically encrypted AR/VR user data. AR/VR process using homomorphically encrypted AR/VR user data 124 processes encrypted AR/VR user data 114, cleartext metadata 116, and public key 112 to generate encrypted AR/VR results 126. In an implementation, AR/VR results 126 may include a highlighted object, the price of an item, a grocery list, the number of steps taken, a text message, the number of times a location has been visited, the names of nearby friends, a virtual assistant response, etc.

Encrypted AR/VR results 126 are encrypted using public key 112 of the user inside a HE process within AR/VR process using homomorphically encrypted AR/VR user data 124. Portions of server AR/VR application 122 (including AR/VR process using homomorphically encrypted AR/VR user data 124) may be implemented in a parallel manner by computing such portions on a plurality of compute nodes (e.g., processing cores)(not shown in FIG. 1) implemented by server computing device 120.

Server AR/VR application 122 sends encrypted AR/VR results 126 back to the requesting client AR/VR application 104. Homomorphic decrypter 128 of client AR/VR application 104 decrypts encrypted AR/VR results 126 using private key 110 to produce cleartext AR/VR results 130. The client AR/VR application and/or the user may then examine or otherwise use the AR/VR results (e.g., display an updated AR/VR world view) from the server-side AR/VR process.

Since the AR/VR user data is never represented as cleartext at the server level within server computing device 120 and the AR/VR process generates encrypted AR/VR results 126, the server computing device 120 does not have access to the user's AR/VR user data or computed AR/VR results. Further, the AR/VR user data and the AR/VR results are never sent in the clear over the network 118.

In an example, one or more of homomorphic encrypter 108, homomorphic decrypter 128, and/or AR/VR process using homomorphically encrypted AR/VR user data 124 are implemented as software instructions executed by a processor. In another example, one or more of homomorphic encrypter 108, homomorphic decrypter 128, and/or AR/VR process using homomorphically encrypted AR/VR user data 124 are implemented as hardware circuitry. In another example, one or more of homomorphic encrypter 108 and/or homomorphic decrypter 128 are implemented as one or more ASICs or FPGAs in client computing device 102. In another example, AR/VR process using homomorphically encrypted AR/VR user data 124 is implemented as an ASIC or FPGA in server computing device 120.

In an example, homomorphic encrypter 108 and homomorphic decrypter 128 implement any suitable HE process, such as (Brakerski, Gentry, Vaikuntanathan (BGV), Cheon, Kim, Kim, Song (CKKS), Fully Homomorphic Encryption, etc.).

Due to some HE processes having high compute requirements, some operations and requests may only retrieve metadata for a selected functionality, while bulk data is requested and sent via secure communication channels. For example, when looking at a store object scans the barcode and retrieves the price, item code, name, and number of times previously purchased, but requires a secure communications channel to retrieve a full description of the item or reviews from other users.

In the example shown in FIG. 1, the client AR/VR application may encrypt the AR/VR user data with HE and send the input data necessary for the server AR/VR application 122 to compute metadata regarding an AR/VR model to display (including model name, texture file names, etc.) and world location and orientation, for example. Then, the actual textures, models, and other large data portions may be requested by the server AR/VR application via more efficient communications channels while still preserving the user's original captured information.

Figure 2:
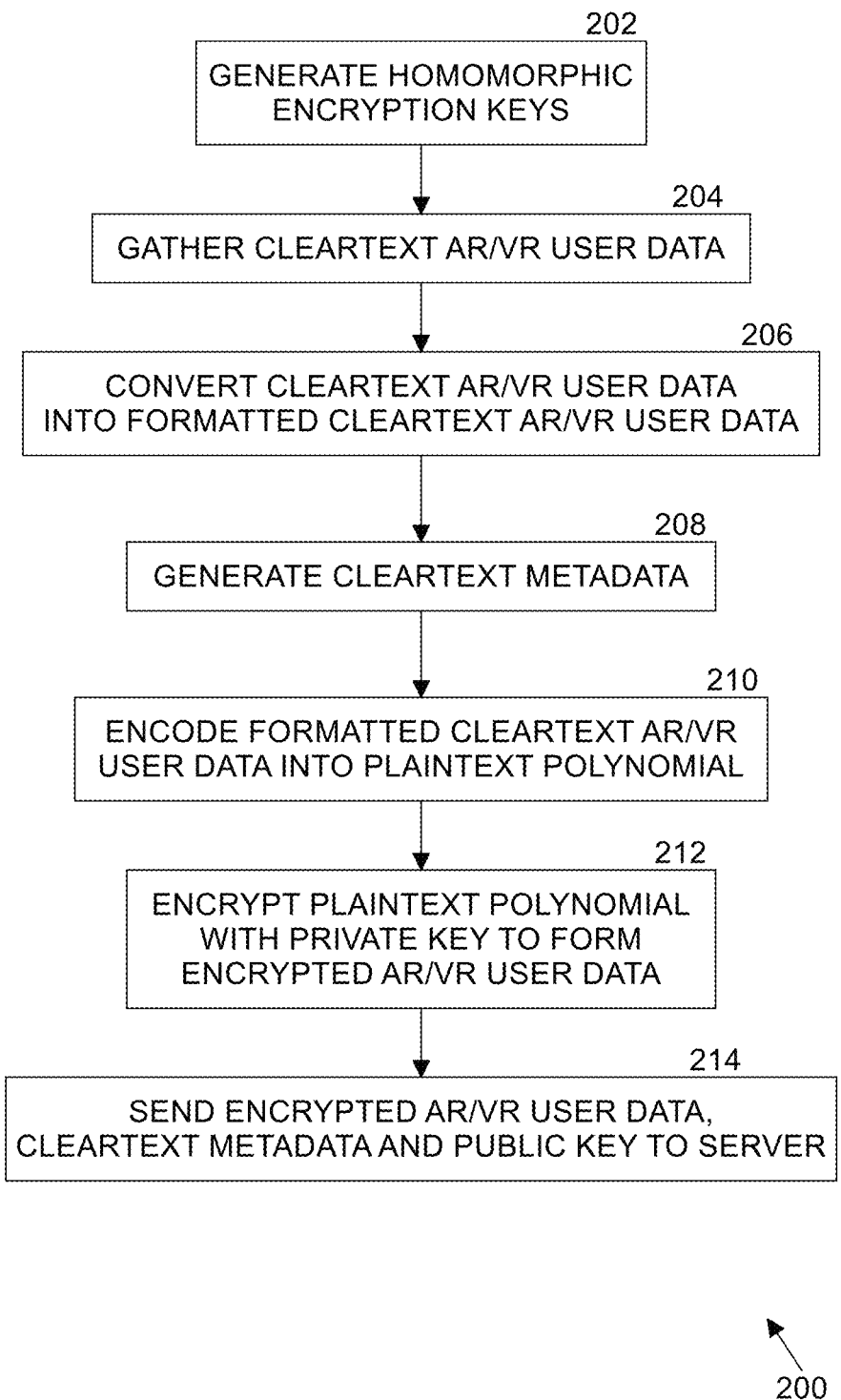
FIG. 2 is a flow diagram of client AR/VR application processing in an example.

FIG. 2 is a flow diagram of client AR/VR application processing 200 in an example. At block 202, client AR/VR application 104 generates homomorphic encryption keys (e.g., private key 110 and public key 112). At block 204, client AR/VR application 104 gathers cleartext AR/VR user data 106 from the user and/or within the client AR/VR application. In an implementation, an AR/VR headset worn by a user captures large amounts of AR/VR user data in a wide variety of forms (e.g., audio, video, location, input commands, etc.). At block 206, client AR/VR application 104 converts the cleartext AR/VR user data into a formatted cleartext AR/VR user data according to requirements of AR/VR process using homomorphically encrypted AR/VR user data 124. In an implementation, the cleartext AE/VR user data may be filtered, separated, and/or pre-processed. Depending on the AR/VR process being run on the server computing device 120, at block 208 the client AR/VR application generates metadata that will instruct the server on which operations to perform and provide details on what needs to be done with the AR/VR user data. At block 210, client AR/VR application 104 encodes the formatted cleartext AR/VR user data into at least one plaintext polynomial. At block 212, homomorphic encrypter 108 encrypts the at least one plaintext polynomial with private key 110 to form encrypted AR/VR user data 114. At block 214, client AR/VR application 104 sends encrypted AR/VR user data 114, cleartext metadata 116 and public key 112 to server AR/VR application 122 of the server computing device 120.

Figure 3:
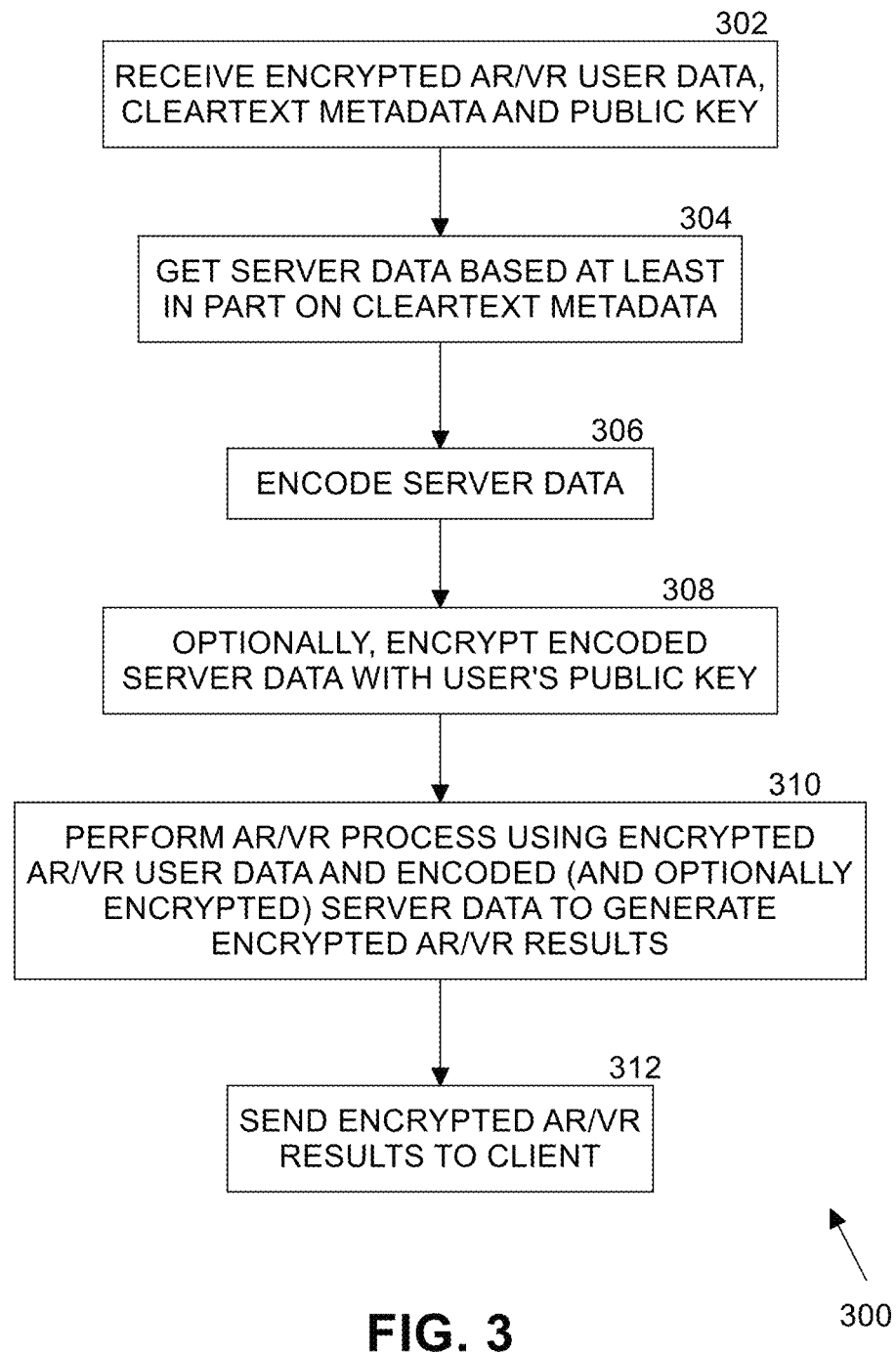
FIG. 3 is a flow diagram of server AR/VR application processing according to an example.

FIG. 3 is a flow diagram of server AR/VR application processing 300 according to an example. At block 302, server AR/VR application 122 receives encrypted AR/VR user data 114, cleartext metadata 116 and public key 112 from the client computing device 102. At block 304, server AR/VR application 122 gets server data based at least in part on cleartext metadata 116. At block 306, the server data 125 is encoded. Encoding maps cleartext values to one or more plaintext polynomials. HE operations are valid for operations involving combinations of plaintexts and ciphertexts. The encoding scheme/plaintext is determined by HE context parameters (e.g., in cleartext metadata 116) and would need to be agreed upon between client AR/VR application 104 and server AR/VR application 122.

In one example, the server AR/VR application 122 encodes and formats a portion of server data 125 required to perform inference processing on a neural network (including weights, biases, etc., converted to values of matrices for matrix multiplication operations. In an implementation, cleartext metadata 116 may include HE parameters such as multiplicative depth, security level, type of primitive operations, etc. For example, cleartext metadata 116 may indicate object classification operations should be performed by the server. At block 308, the encoded server data is optionally encrypted using the user's public key 112 (received from client computing device 102). At block 310, AR/VR process using homomorphically encrypted AR/VR user data 124 performs an AR/VR process using encrypted AR/VR user data 114 and the encoded (and optionally encrypted) server data to generate encrypted AR/VR results 126 according to cleartext metadata 116 (e.g., which may include details of one or more requested operations to perform on the encrypted AR/VR user data). Further details of an example of processing of block 310 are described in FIGS. 5 through 9 below. At block 312, server AR/VR application 122 sends encrypted AR/VR results 126 to client AR/VR application 104.

Figure 4:
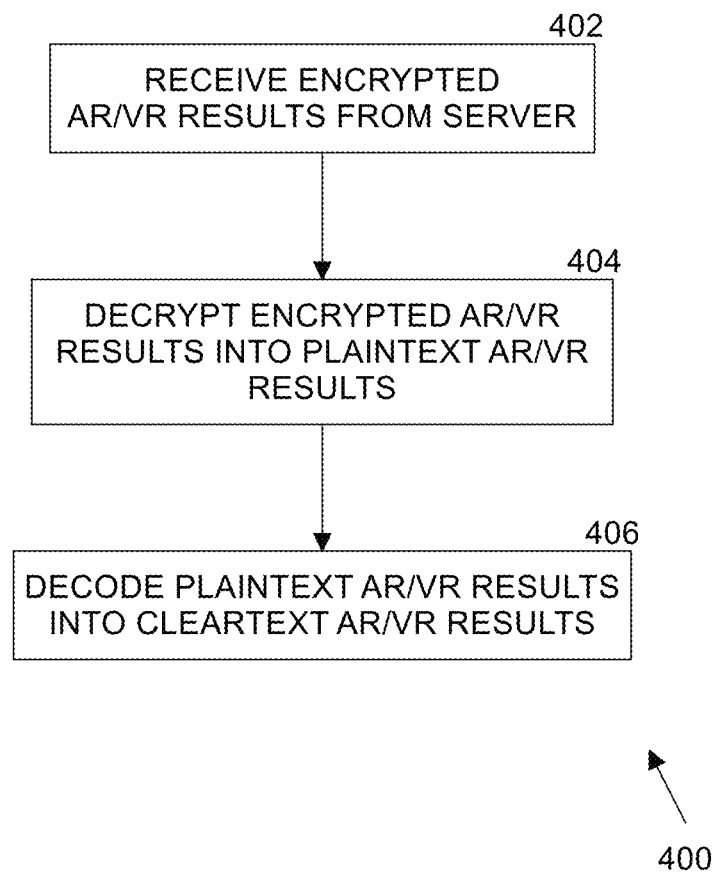
FIG. 4 is a flow diagram of client AR/VR application processing according to an example.

FIG. 4 is a flow diagram of client AR/VR application processing 400 according to an example. At block 402, client AR/VR application 104 receives encrypted AR/VR results 126 from server AR/VR application 122. At block 404, homomorphic decrypter 128 of client AR/VR application 104 decrypts the encrypted AR/VR results 126 into plaintext AR/VR results. At block 406, client AR/VR application 104 decodes the plaintext AR/VR results into cleartext AR/VR results 130. The cleartext AR/VR results 130 are then available to the user (in the clear) and/or for use by client AR/VR application 104.

AR/VR process using homomorphically encrypted AR/VR user data 124 may implement any appropriate AR/VR process. The AR/VR process may include any AR/VR processing task, such as computer vision (image and audio object detection/recognition, segmentation or optical character recognition, scene reconstruction, etc.), location services (including tracking), queries (search, lookup, etc.), command interpretation, and so on. Depending on the HE process being used to implement the secure AR/VR process, the details of blocks 260 to 212 of FIG. 2 and blocks 306 to 310 of FIG. 3 may be changed.

In an illustrative example, AR/VR process using homomorphically encrypted AR/VR user data 124 and block 310 of FIG. 3 implement an object classification using a neural network (such as a VGG16 neural network, which is a convolutional neural network 16 layers deep, as proposed by Karen Simonyan and Andrew Zisserman in "Very Deep Convolutional Networks for Large-Scale Image Recognition," International Conference on Learning Representations (ICLR) 2015, Apr. 10, 2015). In other implementations, other AR/VR processes may be used.

Figure 5:
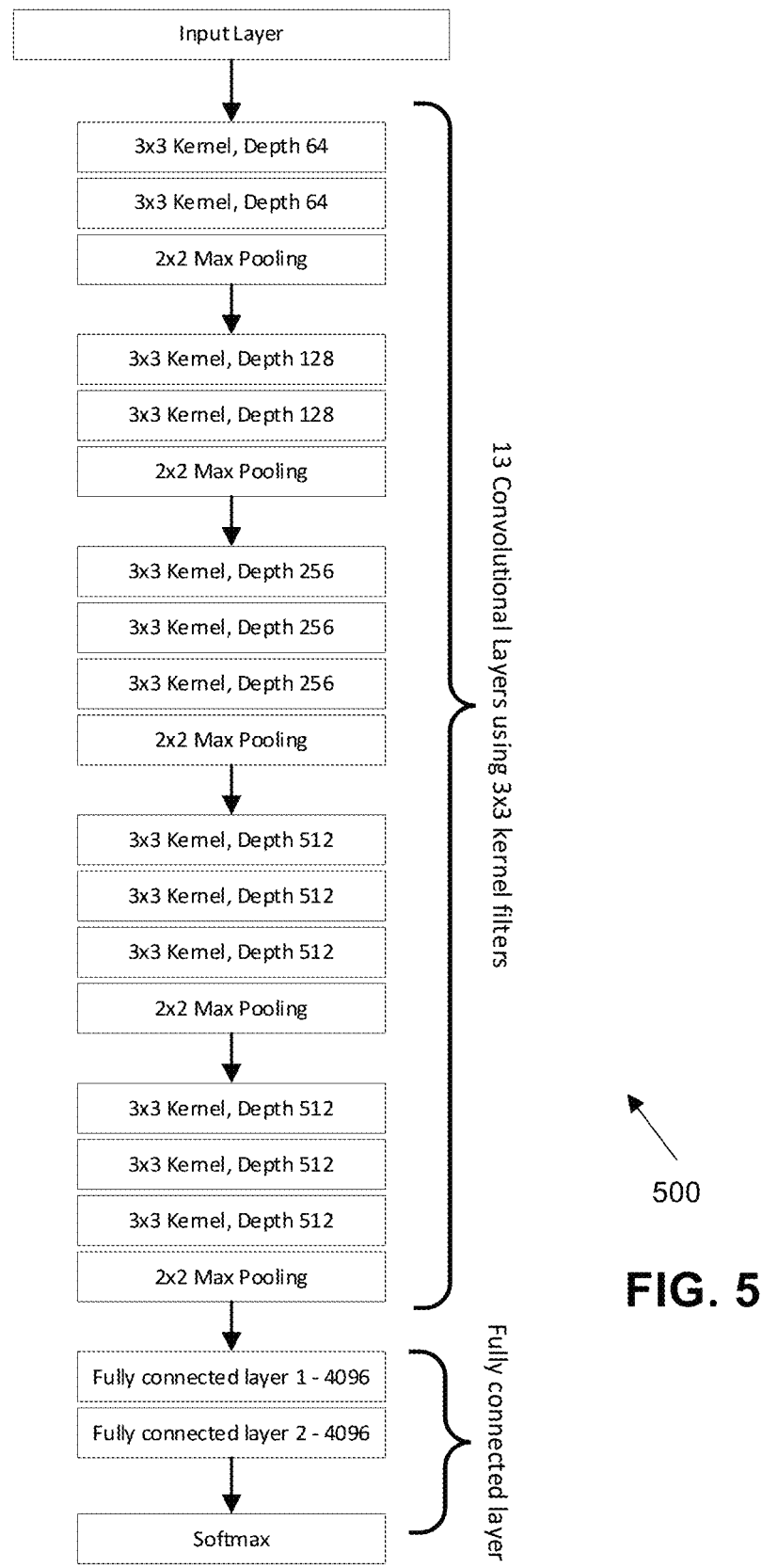
FIG. 5 is an example of a neural network diagram.

FIG. 5 is an example of a neural network 500 diagram showing a typical VGG16 architecture. Neural network 500 includes 13 convolutional layers 502 followed by two fully connected layers 504. The server AR/VR application 122 provides an HE implementation of this network within AR/VR process using homomorphically encrypted AR/VR user data 124. The neural network can be decomposed into a series of matrix multiplications.

There are many variations that can be used to implement a matrix multiplication in HE, depending on the nature of the matrices involved. A familiar variation is to represent each row of the left side matrix as a ciphertext, and each column of the right side matrix as a ciphertext. The dot product of each of the left matrix ciphertexts with the right matrix's ciphertexts is the result of the matrix multiplication.

Figure 6:
FIG. 6 is a diagram of using a homomorphic encryption (HE) scheme according to an example.

The client AR/VR application 104 encodes an input image (e.g., AR/VR user data) for object classification as a matrix where each row of the matrix is a row of pixel intensity values for a channel. There are commonly three channels in a color image (red, green, and blue). This encoding method is commonly known as channel-height-width (CHW). The resulting matrix is encoded into a polynomial representation and encrypted using the appropriate HE scheme (Brakerski, Gentry, Vaikuntanathan (BGV), Cheon, Kim, Kim, Song (CKKS), Fully Homomorphic Encryption, etc.) for the whole object classification operation as expected by the server AR/VR application 122. Encryption parameters (security levels, noise budget, operation depth, etc.) and input format are public knowledge based on the selected HE algorithm. FIG. 6 is a diagram 600 of using a homomorphic encryption (HE) scheme according to an example.

Figure 7:
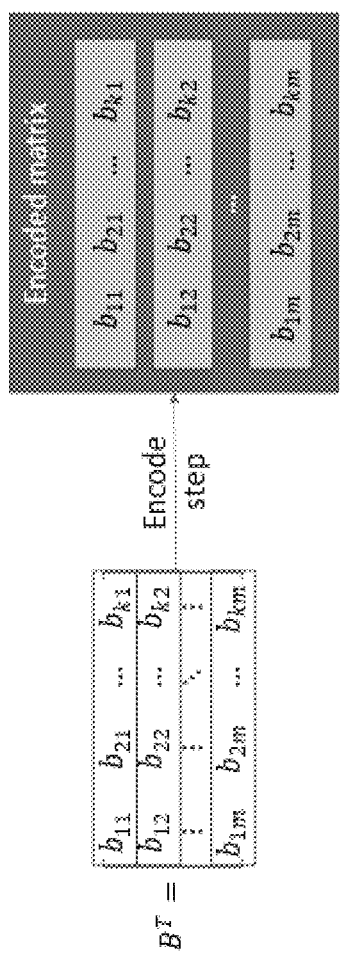
FIG. 7 is a diagram of encoding a matrix according to an example.

On the server computing device 120, each matrix for the neural network is private to the server computing device (and thus the server AR/VR application 122), so there is no need to perform full encryption, just encoding compatible with the selected HE scheme. In general, HE operations between encrypted and non-encrypted data result in encrypted data. Each matrix corresponding to every layer of the neural network is encoded in row format by server AR/VR application 122 or AR/VR process using homomorphically encrypted AR/VR user data 124. FIG. 7 is a diagram of encoding a matrix according to an example.

Figure 8:
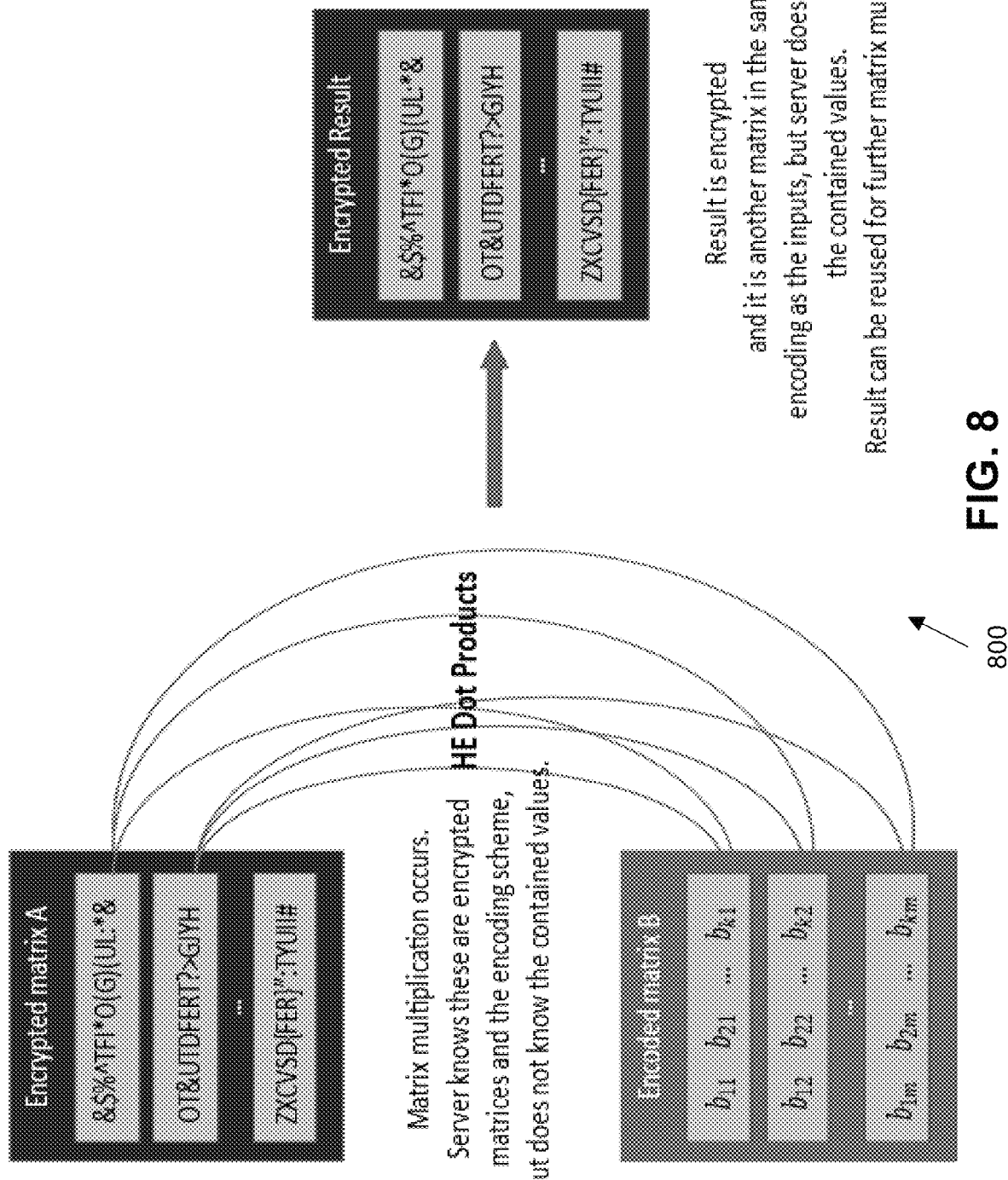
FIG. 8 is a diagram of homomorphically computing a dot product of two ciphertexts according to an example.

FIG. 8 is a diagram 800 of homomorphically computing a dot product of two ciphertexts according to an example. There are also many ways to compute homomorphically the dot product of two ciphertexts. One common process is to straightforward multiply both ciphertext element-wise, and then accumulate the resulting ciphertext. Fully connected (or dense) layers are matrix multiplications by default. Convolutional layers can be encoded as matrices that when multiplied with rearranged inputs as shown below, the results are correct.

Let's assume an input I1 and a kernel K1 for a convolution as below:

$$I1 = \begin{pmatrix} I_{111} & I_{112} & I_{113} & I_{114} & I_{115} \\ I_{121} & I_{122} & I_{123} & I_{124} & I_{125} \\ I_{131} & I_{132} & I_{133} & I_{134} & I_{135} \\ I_{141} & I_{142} & I_{143} & I_{144} & I_{145} \end{pmatrix}$$

$$K1 = \begin{pmatrix} k_{111} & k_{112} & k_{113} \\ k_{121} & k_{122} & k_{123} \\ k_{131} & k_{132} & k_{133} \end{pmatrix}$$

Then, the input and kernel can be arranged into matrices as follows:

$$I1\_1 = \begin{pmatrix} I_{111} & I_{112} & I_{113} & I_{114} & I_{115} & I_{121} & I_{122} & I_{123} & I_{124} & I_{125} & I_{131} & I_{132} & I_{133} & I_{134} & I_{135} \\ I_{121} & I_{122} & I_{123} & I_{124} & I_{125} & I_{131} & I_{132} & I_{133} & I_{134} & I_{135} & I_{141} & I_{142} & I_{143} & I_{144} & I_{145} \end{pmatrix}$$

$$K1\_1 = \begin{pmatrix} k_{111} & 0 & 0 \\ k_{112} & k_{111} & 0 \\ k_{113} & k_{112} & k_{111} \\ 0 & k_{113} & k_{112} \\ 0 & 0 & k_{113} \\ k_{121} & 0 & 0 \\ k_{122} & k_{121} & 0 \\ k_{123} & k_{122} & k_{121} \\ 0 & k_{123} & k_{122} \\ 0 & 0 & k_{123} \\ k_{131} & 0 & 0 \\ k_{132} & k_{131} & 0 \\ k_{133} & k_{132} & k_{131} \\ 0 & k_{133} & k_{132} \\ 0 & 0 & k_{133} \end{pmatrix}$$

The result of multiplying matrices I1_1 and K1_1 is the same as the convolution of I1 using kernel K1 as sliding window over I1 with a stride of 1 on the vertical and horizontal directions.

On the server computing device 120, since the server knows the values for all its kernels, the server AR/VR application or AR/VR process using homomorphically encrypted AR/VR user data 124 can rearrange them easily on this format.

It is also known that the encrypted input for each convolutional layer is a collection of ciphertexts where each ciphertext represents a row of the input matrix. Using a series of rotations, padding, and additions of ciphertexts in the HE space, it is simple to rearrange the input matrix to match the format required for the correct computation of a convolution.

The series of matrix multiplications in the HE space occur in sequence on the server side to compute the result of applying VGG16 to the encrypted input. Considerations for HE details such as noise management, bootstrapping and so on must be put in place in the implementation.

Figure 9:
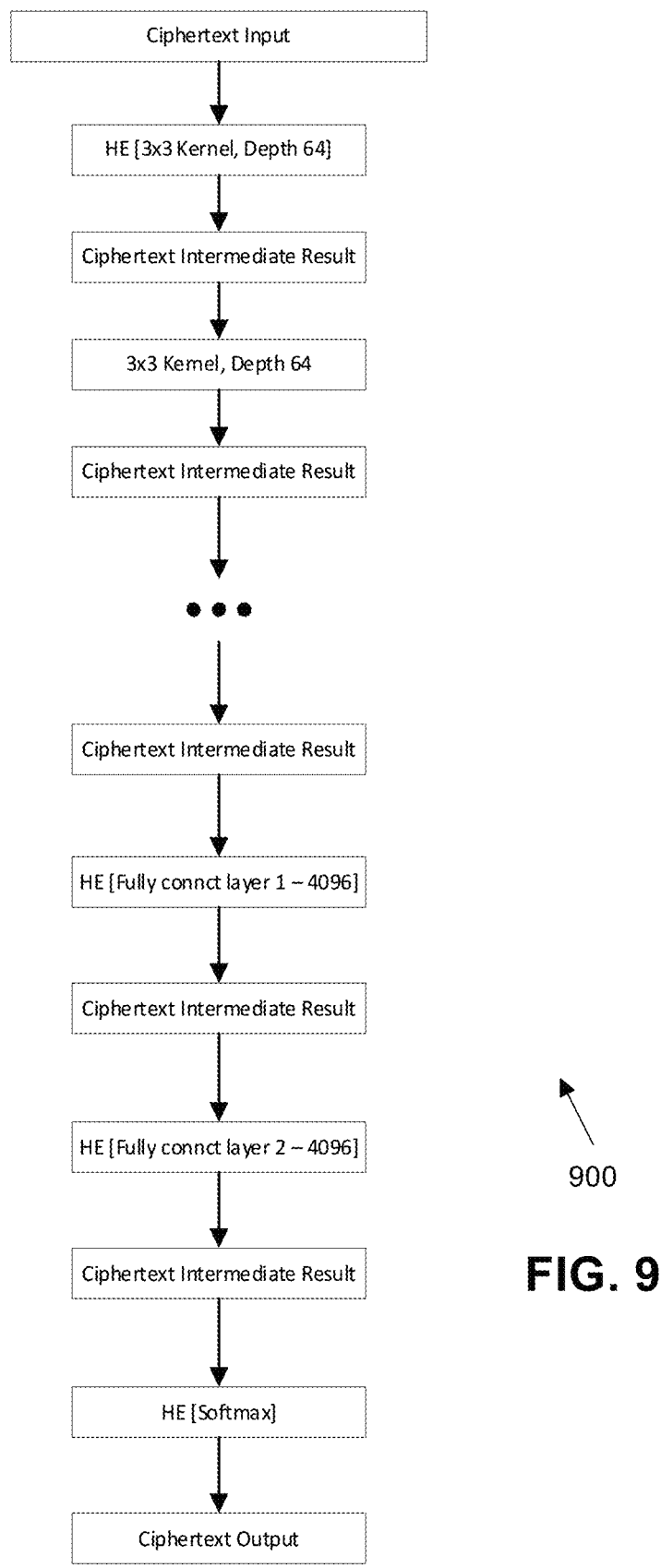
FIG. 9 is a diagram of a ciphertext neural network according to an example.

FIG. 9 is a diagram of a ciphertext neural network 900 according to an example. Throughout the execution of the neural network processing, the AR/VR user data 114 received from the client computing device 102, all intermediate results, and final output data called encrypted AR/VR results 126 herein, are inaccessible by the server computing device 120, preserving the privacy of the AR/VR user data 106 and AR/VR results 130. The server only knows cleartext metadata 116 about the encrypted information, and just enough information to perform requested operations.

Finally, if at some point client AR/VR application 104 requires object classification from its current video feed, for example, the client AR/VR application 104 would capture the necessary image(s) from the feed.

In an implementation, a result of applying VGG16 is vector of probabilities. The item with the highest probability indicates the object classification (a car, a dog, a burger, etc.) based on a published classification table. Once AR/VR results are obtained in cleartext, then the client AR/VR application 104 can use the cleartext AR/VR results 130 of VGG16 to know which object was captured in the video stream and use the object as intended in the user's AR/VR computing device.

While an example manner of implementing the technology described herein is illustrated in FIGS. 1-9, one or more of the elements, processes, and/or devices illustrated in FIGS. 1-9 may be combined, divided, re-arranged, omitted, eliminated, and/or implemented in any other way. Further, the example improved computing system 100 may be implemented by hardware, software, firmware, and/or any combination of hardware, software, and/or firmware. Thus, for example, any portion or all of the improved computing system could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example hardware resources is/are hereby expressly defined to include a non-transitory computer readable storage device or storage disk such as a memory, a digital versatile disk (DVD), a compact disk (CD), a Blu-ray disk, etc., including the software and/or firmware. Further still, the example embodiments of FIGS. 1-9 may include one or more elements, processes, and/or devices in addition to, or instead of, those illustrated in FIGS. 1-9, and/or may include more than one of any or all the illustrated elements, processes and devices.

Flowcharts representative of example hardware logic circuitry, machine readable instructions, hardware implemented state machines, and/or any combination thereof is shown in FIGS. 2-4. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 2-4, many other methods of implementing the example computing system may alternatively be used. For example, the order of execution of the blocks may be changed, and/or some of the blocks described may be changed, eliminated, or combined.

Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 2-4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10:
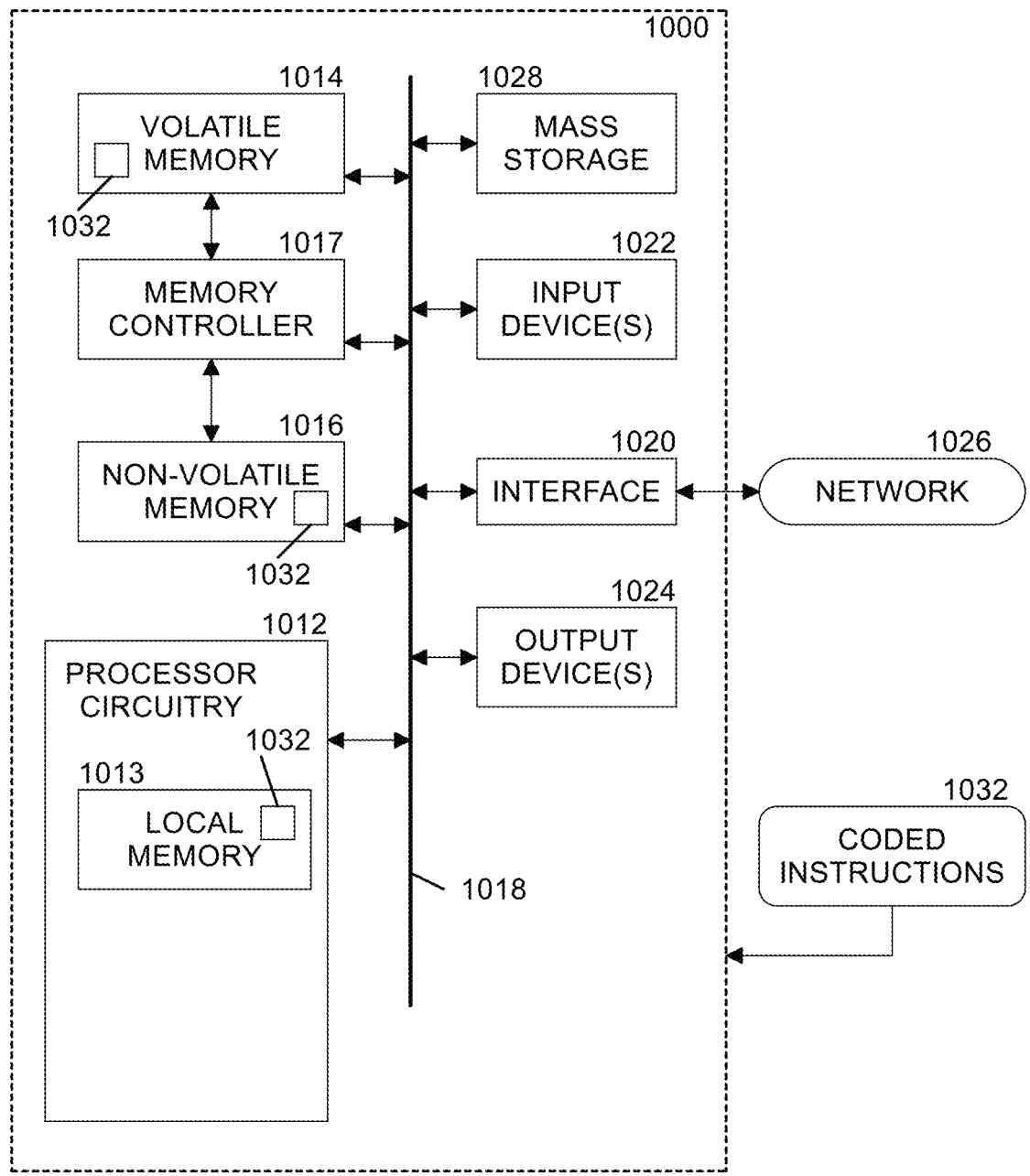
FIG. 10 is a block diagram of an example processor platform structured to execute and/or instantiate the machine-readable instructions and/or operations of FIGS. 1-9 to implement the apparatus discussed with reference to FIGS. 1-9.

FIG. 10 is a block diagram of an example processor platform 1000 structured to execute and/or instantiate the machine-readable instructions and/or operations of FIGS. 1-9. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine-readable instructions and/or operations of FIGS. 1-9, may be stored in the mass storage device 1028, in the volatile memory 1014, in the non-volatile memory 1016, and/or on a removable non-transitory computer readable storage medium such as a CD or DVD.

Figure 11:
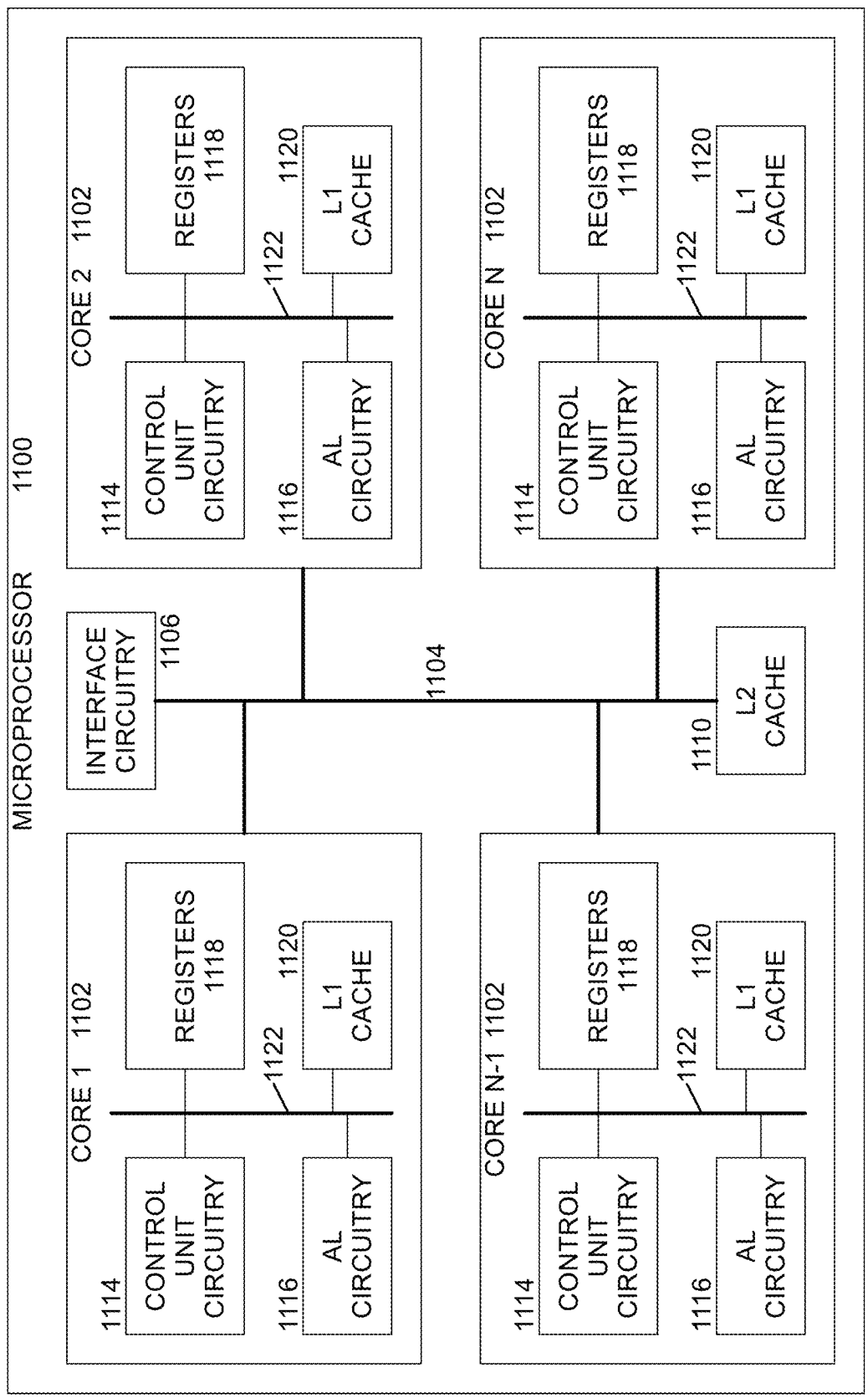
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 11 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all the machine-readable instructions and/or operations represented by the flowchart of FIGS. 2-4.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache in local memory 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating point operations. In yet other examples, the AL circuitry 1116 may include first AL circuitry that performs integer-based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 9. Alternatively, the registers 1118 may be organized in any other arrangement, format, or structure including distributed throughout the core 1102 to shorten access time. The bus 1104 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
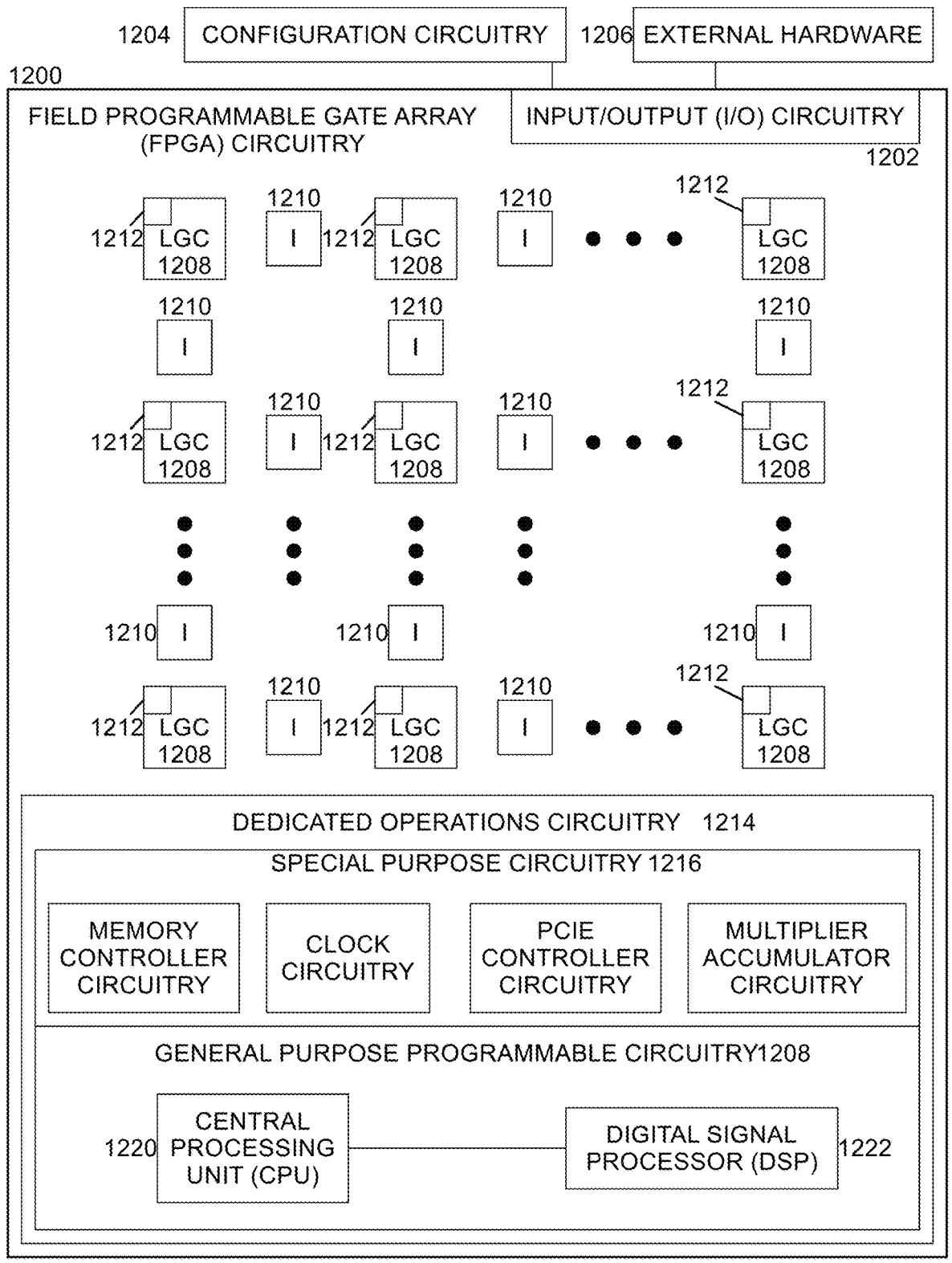
FIG. 12 is a block diagram of another example implementation of the processor circuitry of FIG. 10.
Figure 13:
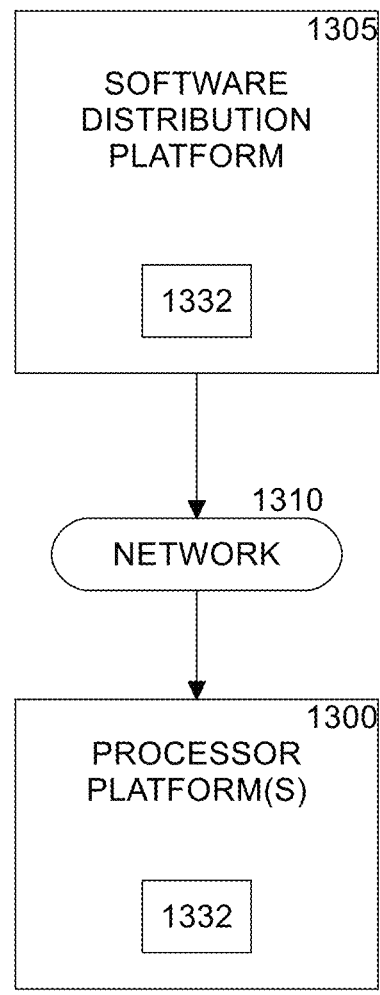
FIG. 13 is a block diagram illustrating an example software distribution platform to distribute software such as the example machine readable instructions of FIG. 10 to hardware devices owned and/or operated by third parties.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine-readable instructions. However, once configured, the FPGA circuitry 1200 instantiates the machine-readable instructions in hardware and, thus, can often execute the operations faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 2-4 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine-readable instructions represented by the flowcharts of FIGS. 2-4. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 2-4. As such, the FPGA circuitry 1200 may be structured to effectively instantiate some or all the machine-readable instructions of the flowcharts of FIGS. 2-4 as dedicated logic circuits to perform the operations corresponding to those software instructions in a dedicated manner analogous to an ASIC. Therefore, the FPGA circuitry 1200 may perform the operations corresponding to the some or all the machine-readable instructions of FIGS. 2-4 faster than the general-purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine-readable instructions of FIGS. 2-4 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine-readable instructions represented by the flowcharts of FIGS. 2-4 may be executed by one or more of the cores 1102 of FIG. 11 and a second portion of the machine-readable instructions represented by the flowcharts of FIGS. 2-4 may be executed by the FPGA circuitry 1200 of FIG. 12.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

A block diagram illustrating an example software distribution platform 1305 to distribute software such as the example machine readable instructions 1032 of FIG. 10 to hardware devices owned and/or operated by third parties is illustrated in FIG. 11. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine-readable instructions 1032, which may correspond to the example machine readable instructions, as described above. The one or more servers of the example software distribution platform 1305 are in communication with a network 1310, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1032 from the software distribution platform 1305. For example, the software, which may correspond to the example machine readable instructions described above, may be downloaded to the example microprocessor 1300, which is to execute the machine-readable instructions 1032 to implement the methods described above and associated computing system 100. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

In some examples, an apparatus includes means for data processing of FIGS. 1-9. For example, the means for processing may be implemented by processor circuitry, processor circuitry, firmware circuitry, etc. In some examples, the processor circuitry may be implemented by machine executable instructions executed by processor circuitry, which may be implemented by the example processor circuitry 1012 of FIG. 10, the example microprocessor 1300 of FIG. 11, and/or the example Field Programmable Gate Array (FPGA) circuitry 1200 of FIG. 12. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide improved security in a computing system. The disclosed systems, methods, apparatus, and articles of manufacture improve the performance of implementing a privacy-protected search in a computing system. The disclosed systems, methods, apparatus, and articles of manufacture are accordingly directed to one or more improvement(s) in the operation of a machine such as a computer or other electronic and/or mechanical device.

The following examples pertain to further embodiments. Specifics in the examples may be used anywhere in one or more embodiments. Example 1 is a method including receiving, by a server computing device, encrypted augmented reality/virtual reality (AR/VR) user data and cleartext metadata associated with the encrypted AR/VR user data from a client computing device; getting server data based at least in part on cleartext metadata; encoding the server data; performing an AR/VR process on the encrypted AR/VR user data and the encoded server data to generate encrypted AR/VR results; and sending the encrypted AR/VR results to the client computing device. In Example 2, the subject matter of Example 1 optionally includes wherein the encrypted AR/VR user data is encrypted with a homomorphic encryption process. In Example 3, the subject matter of Example 2 optionally includes wherein cleartext AR/VR user data is encoded into at least one plaintext polynomial and the at least one plaintext polynomial is encrypted with a homomorphic encryption private key of the homomorphic encryption process, and comprising receiving, by the server computing device, a homomorphic encryption public key of the homomorphic encryption process. In Example 4, the subject matter of Example 3 optionally includes encrypting the encoded server data with the homomorphic encryption public key prior to performing the AR/VR process on the encrypted AR/VR user data and the encoded server data. In Example 5, the subject matter of Example 3 optionally includes wherein the cleartext metadata is generated from the cleartext AR/VR user data.

Example 6 is at least one machine-readable storage medium comprising instructions which, when executed by at least one processor, cause the at least one processor to receive, by a server computing device, encrypted augmented reality/virtual reality (AR/VR) user data and cleartext metadata associated with the encrypted AR/VR data from a client computing device; get server data based at least in part on cleartext metadata; encode the server data; perform an AR/VR process on the encrypted AR/VR user data and the encoded server data to generate encrypted AR/VR results; and send the encrypted AR/VR results to the client computing device. In Example 7, the subject matter of Example 6 optionally includes wherein the encrypted AR/VR user data is encrypted with a homomorphic encryption process. In Example 8, the subject matter of Example 7 optionally includes wherein cleartext AR/VR user data is encoded into at least one plaintext polynomial and the at least one plaintext polynomial is encrypted with a homomorphic encryption private key of the homomorphic encryption process, comprising instructions which, when executed by at least one processor, cause the at least one processor to receive, by the server computing device, a homomorphic encryption public key of the homomorphic encryption process. In Example 9, the subject matter of Example 8 optionally includes instructions which, when executed by at least one processor, cause the at least one processor to encrypt the encoded server data with the homomorphic encryption public key prior to performing the AR/VR process on the encrypted AR/VR user data. In Example 10, the subject matter of Example 8 optionally includes wherein the cleartext metadata is generated from the cleartext AR/VR user data.

Example 11 is a method including generating a homomorphic encryption private key and a homomorphic encryption public key; gathering cleartext augmented reality/virtual reality (AR/VR) user data; generating cleartext metadata; encoding the cleartext AR/VR user data into at least one plaintext polynomial; encrypting the at least one plaintext polynomial with the homomorphic encryption public key using a homomorphic encryption process to generate encrypted AR/VR user data; and sending the encrypted AR/VR user data and the cleartext metadata to a server computing device. In Example 12, the subject matter of Example 11 optionally includes receiving encrypted AR/VR results from the server computing device in response to sending the encrypted AR/VR user data and the cleartext metadata; decrypting the encrypted AR/VR results with the homomorphic encryption private key using a homomorphic decryption process to generate plaintext AR/VR results; and decoding the plaintext AR/VR results into cleartext AR/VR results. In Example 13, the subject matter of Example 11 optionally includes sending the homomorphic encryption public key to the server computing device.

Example 14 is at least one machine-readable storage medium comprising instructions which, when executed by at least one processor, cause the at least one processor to generate a homomorphic encryption private key and a homomorphic encryption public key; gather cleartext augmented reality/virtual reality (AR/VR) user data; generate cleartext metadata; encode the cleartext AR/VR user data into at least one plaintext polynomial; encrypt the at least one plaintext polynomial with the homomorphic encryption public key using a homomorphic encryption process to generate an encrypted AR/VR user data; and send the encrypted AR/VR user data and the cleartext metadata to a server computing device. In Example 15, the subject matter of Example 41 optionally includes instructions which, when executed by at least one processor, cause the at least one processor to receive encrypted AR/VR results from the server computing device in response to sending the encrypted AR/VR user data and the cleartext metadata; decrypt the encrypted AR/VR results with the homomorphic encryption private key using a homomorphic decryption process to generate plaintext AR/VR results; and decode the plaintext AR/VR results into cleartext AR/VR results. In Example 16, the subject matter of Example 15 optionally includes instructions which, when executed by at least one processor, cause the at least one processor to send the homomorphic encryption public key to the server computing device.

Example 17 is a system including a client computing device to generate a homomorphic encryption private key and a homomorphic encryption public key; gather cleartext augmented reality/virtual reality (AR/VR) user data; generate cleartext metadata; encode the cleartext AR/VR user data into at least one plaintext polynomial; encrypt the at least one plaintext polynomial with the homomorphic encryption public key using a homomorphic encryption process to generate encrypted AR/VR user data; and send the encrypted AR/VR user data and the cleartext metadata; and a server computing device to receive the encrypted AR/VR user data and the cleartext metadata associated with the encrypted AR/VR user data from the client computing device; get server data based at least in part on cleartext metadata; encode the server data; perform an AR/VR process on the encrypted AR/VR user data and the encoded server data to generate encrypted AR/VR results; and send the encrypted AR/VR results to the client computing device. In Example 18, the subject matter of Example 17 optionally includes the client computing device to send the homomorphic encryption public key to the server computing device. In Example 19, the subject matter of Example 18 optionally includes the server computing device to encrypt the encoded server data with the homomorphic encryption public key prior to performing the AR/VR process on the encrypted AR/VR user data. In Example 20, the subject matter of Example 17 optionally includes the client computing device to receive the encrypted AR/VR results from the server computing device in response to sending the encrypted AR/VR user data and the cleartext metadata; decrypt the encrypted AR/VR results with the homomorphic encryption private key using a homomorphic decryption process to generate plaintext AR/VR results; and decode the plaintext AR/VR results into cleartext AR/VR results.

Example 21 is an apparatus operative to perform the method of any one of Examples 1 to 5 and 11 to 13. Example 22 is an apparatus that includes means for performing the method of any one of Examples 1 to 5 and 11 to 13. Example 22 is an apparatus that includes any combination of modules and/or units and/or logic and/or circuitry and/or means operative to perform the method of any one of Examples 1 to 5 and 11 to 13. Example 23 is an optionally non-transitory and/or tangible machine-readable medium, which optionally stores or otherwise provides instructions that if and/or when executed by a computer system or other machine are operative to cause the machine to perform the method of any one of Examples 1 to 5 and 11 to 13.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method comprising:
   receiving, by a server computing device, encrypted augmented reality/virtual reality (AR/VR) user data and cleartext metadata associated with the encrypted AR/VR user data from a client computing device, wherein the encrypted AR/VR user data is encrypted with a homomorphic encryption process;
   getting server data based at least in part on cleartext metadata;
   encoding the server data;
   performing an AR/VR process on the homomorphically encrypted AR/VR user data and the encoded server data to generate homomorphically encrypted AR/VR results; and
   sending the homomorphically encrypted AR/VR results to the client computing device.

2. The method of claim 1, wherein the cleartext AR/VR user data is encoded into at least one plaintext polynomial and the at least one plaintext polynomial is encrypted with a homomorphic encryption private key of the homomorphic encryption process, and comprising receiving, by the server computing device, a homomorphic encryption public key of the homomorphic encryption process.

3. The method of claim 2, comprising encrypting the encoded server data with the homomorphic encryption public key prior to performing the AR/VR process on the encrypted AR/VR user data and the encoded server data.

4. The method of claim 2, wherein the cleartext metadata is generated from the cleartext AR/VR user data.

5. At least one non-transitory machine-readable storage medium comprising instructions which, when executed by at least one processor, cause the at least one processor to:
   receive, by a server computing device, encrypted augmented reality/virtual reality (AR/VR) user data and cleartext metadata associated with the encrypted AR/VR data from a client computing device, wherein the encrypted AR/VR user data is encrypted with a homomorphic encryption process;
   get server data based at least in part on cleartext metadata;
   encode the server data;
   perform an AR/VR process on the homomorphically encrypted AR/VR user data and the encoded server data to generate homomorphically encrypted AR/VR results; and
   send the homomorphically encrypted AR/VR results to the client computing device.

6. The at least one non-transitory machine-readable storage medium of claim 5, wherein the encrypted AR/VR user data is encrypted with a homomorphic encryption process.

7. The at least one non-transitory machine-readable storage medium of claim 6, wherein cleartext AR/VR user data is encoded into at least one plaintext polynomial and the at least one plaintext polynomial is encrypted with a homomorphic encryption private key of the homomorphic encryption process, comprising instructions which, when executed by at least one processor, cause the at least one processor to receive, by the server computing device, a homomorphic encryption public key of the homomorphic encryption process.

8. The at least one non-transitory machine-readable storage medium of claim 7, comprising instructions which, when executed by at least one processor, cause the at least one processor to encrypt the encoded server data with the homomorphic encryption public key prior to performing the AR/VR process on the encrypted AR/NR user data.

9. The at least one non-transitory machine-readable storage medium of claim 7, wherein the cleartext metadata is generated from the cleartext AR/VR user data.

10. A system comprising:
    a client computing device to:
        generate a homomorphic encryption private key and a homomorphic encryption public key;
        gather cleartext augmented reality/virtual reality (AR/VR) user data;
        generate cleartext metadata;
        encode the cleartext AR/VR user data into at least one plaintext polynomial;
        encrypt the at least one plaintext polynomial with the homomorphic encryption public key using a homomorphic encryption process to generate encrypted AR/VR user data; and
        send the encrypted AR/VR user data and the cleartext metadata; and
    a server computing device to:
        receive the encrypted AR/VR user data and the cleartext metadata associated with the encrypted AR/VR user data from the client computing device;

get server data based at least in part on cleartext metadata;
encode the server data;
perform an AR/VR process on the encrypted AR/VR user data and the encoded server data to generate encrypted AR/VR results; and
send the encrypted AR/VR results to the client computing device.

11. The system of claim 10, comprising the client computing device to send the homomorphic encryption public key to the server computing device.

12. The system of claim 11, comprising the server computing device to encrypt the encoded server data with the homomorphic encryption public key prior to performing the AR/VR process on the encrypted AR/VR user data.

13. The system of claim 10, comprising the client computing device to:
receive the encrypted AR/VR results from the server computing device in response to sending the encrypted AR/VR user data and the cleartext metadata;
decrypt the encrypted AR/VR results with the homomorphic encryption private key using a homomorphic decryption process to generate plaintext AR/VR results; and
decode the plaintext AR/MR results into cleartext AR/MR results.

* * * * *